United States Patent
Guo et al.

(10) Patent No.: US 11,015,924 B2
(45) Date of Patent: May 25, 2021

(54) METHOD OF CALCULATING ETCHING PROFILE OF ACID-ETCHED FRACTURE SYSTEM CONSIDERING COMPLEX FILTRATION MEDIA

(71) Applicant: SOUTHWEST PETROLEUM UNIVERSITY, Chengdu (CN)

(72) Inventors: Jianchun Guo, Chengdu (CN); Jichuan Ren, Chengdu (CN); Bo Gou, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 17/089,746

(22) Filed: Nov. 5, 2020

(65) Prior Publication Data

US 2021/0048293 A1 Feb. 18, 2021

(30) Foreign Application Priority Data

Jan. 8, 2020 (CN) .......................... 202010018679.2

(51) Int. Cl.
*G01B 21/20* (2006.01)
*E21B 43/27* (2006.01)
*E21B 47/06* (2012.01)
*E21B 49/00* (2006.01)
*G01V 99/00* (2009.01)

(52) U.S. Cl.
CPC .............. *G01B 21/20* (2013.01); *E21B 43/27* (2020.05); *E21B 47/06* (2013.01); *E21B 49/00* (2013.01); *G01V 99/005* (2013.01); *E21B 2200/20* (2020.05)

(58) Field of Classification Search
CPC ......... G01B 21/20; E21B 43/27; E21B 47/06; E21B 49/00; E21B 2200/20; E21B 43/26; G01V 99/005; G01V 2210/646
See application file for complete search history.

(56) References Cited

PUBLICATIONS

Liu et al., Acid Fracturing Technique for Carbonate Reservoirs Using Nitric Acid Powder, Jun. 2005, Journal of Canadian Petroleum Technology, vol. 44, No. 6, pp. 46-52 (Year: 2005).*
One Petro_Search_Results, Jan. 23, 2021, 8 pp. (Year: 2021).*

* cited by examiner

*Primary Examiner* — Toan M Le

(57) ABSTRACT

The invention introduces a method of calculating etching profile of acid-etched fracture system considering complex filtration media, which mainly considers dynamic filtration caused by natural fractures and acid-etched wormholes in acid fracturing, calculates the above filtration process by a numerical method, and finally calculates acid etching profile of acid-etched fracture system based on acid concentration profile. Calculation equations include fluid pressure in natural fractures, filtration velocity in natural fractures, fracture geometry of hydraulic fractures, fluid pressure in matrix rock, acid concentration profile in natural fractures and hydraulic fractures, acid etching width in hydraulic fractures and natural fractures, and length of acid-etched wormhole, etc. The invention is reliable in principle and efficient in calculation, which is also beneficial to accurately calculating fracture etching profiles of acid fracturing in naturally-fractured reservoirs, improving the accuracy of optimizing acid fracturing treatment parameters, and providing guiding significance for acid fracturing optimization of naturally-fractured carbonate reservoirs.

8 Claims, 10 Drawing Sheets

METHOD OF CALCULATING ETCHING PROFILE OF ACID-ETCHED FRACTURE SYSTEM CONSIDERING COMPLEX FILTRATION MEDIA

FIELD OF THE INVENTION

The invention relates to the technical field of petroleum engineering, in particular to a method of calculating etching profile of acid-etched fracture system considering complex filtration media.

BACKGROUND OF THE INVENTION

In recent years, deep fractured carbonate reservoirs have been found in Sichuan Basin and Tarim Basin, and have become the key areas of oil and gas exploration and development in China. This kind of reservoir has developed natural fractures, and the permeability of matrix rock is relatively poor. Acid fracturing is one of the main methods to stimulate this kind of reservoir.

Acid fracturing is a stimulation treatment which injecting acid into the reservoir to create hydraulic fractures in the reservoir under the pressure condition which higher than the reservoir fracture pressure. At the same time, the acid reacts with the matrix rock, and unevenly etching the hydraulic fracture walls, forming a groove-like or uneven etching form, which makes the hydraulic fracture not completely closed after the treatment, and finally forms an acid-etched fracture with a certain geometric size and flow capacity, thus realizing the increase of oil and gas well production. In the process of acid fracturing, a large amount of acid filtrates through the natural fractures. At the same time, the acid differentially dissolves the high permeability areas on the wall of the natural fractures, creating acid-etched wormholes, which greatly increases the dynamic filtration of acid during acid fracturing and restricts the stimulation effect. On the other hand, the acid will also etch the wall of the natural fracture when it is filtrating into the natural fracture, and then form a channel with certain flow capacity, thus increasing the overall flow capacity of the "acid-etched fracture system", which composed of the acid-etched hydraulic fractures and natural fractures in the production process. Therefore, the detailed description of natural fracture, acid-etched wormhole filtration and the etching profile of "acid-etched fracture system" are very important for acid fracturing design.

At present, the commonly used calculation method of acid etching profile generally simulates the acid flow-mass transfer-reaction in a fixed given hydraulic fracture geometry (Xue Heng, Huang Zuxi, Zhao Liqiang, et al. A simulation study on the preflush acid fracturing considering rock heterogeneity [J]. Natural Gas Industry, 2018, 38(2):59-66.). And the modified Carter filtration coefficient is generally used to describe the acid filtration in hydraulic fractures. At present, the simulation of wormhole filtration during acid fracturing is mostly based on the two-scale continuum model (Dang Lurui, Zhou Changlin, Huang Mei, et al. Simulation of effective fracture length of prepad acid fracturing considering multiple leak-off effect [J]. Natural Gas Industry, 2018, 38(7): 65-71.). This model requires larger amount of computing resources when calculating small-scale problems, so it can't be well applied to a field sized problem like acid fracturing simulation. The filtration of natural fractures is usually calculated by analytical solution (Ugursal A., Zhu D., & Hill A., D. (2019, Feb. 1). Development of Acid Fracturing Model for Naturally Fractured Reservoirs. Society of Petroleum Engineers. doi:10.2118/189834-PA.). This method simplifies the calculation of natural fractures too much and cannot accurately predict the dynamic filtration caused by natural fractures.

SUMMARY OF THE INVENTION

In view of the above problems, the present invention provides a method to calculate etching profile of acid-etched fracture system that considering complex filtration media, which focuses on the dynamic filtration caused by natural fractures and acid-etched wormholes in the acidizing fracturing process, calculates the considered filtration process by a numerical method, and finally calculates the acid etching profile based on the acid concertation.

The invention adopts the following technical scheme:

A method of calculating etching profile of acid-etched fracture system considering complex filtration media, including the following steps:

step S1: estimating a total filtration volume of acid to natural fractures and matrix rock in a time step, and calculating an average filtration velocity in a fracture propagation grid based on an assumed fluid pressure profile in the matrix rock;

step S2: calculating a fluid pressure in a hydraulic fracture through a hydraulic fracture propagation model and a fluid pressure in natural fractures, and further calculating a fracture geometry of the hydraulic fractures and a fracture geometry of the natural fractures according to the average filtration velocity in step S1;

step S3: calculating a fluid pressure profile in the matrix rock according to the fracture geometry and the fluid pressure in the hydraulic fractures and the fluid pressure in natural fractures obtained in step S2;

step S4: comparing the fluid pressure profile in the matrix rock calculated in step S3 with the assumed fluid pressure profile in the matrix rock in step S1; if it does not match a convergence criterion, taking the fluid pressure profile in the matrix rock calculated in step S3 as the assumed fluid pressure profile into step S1, and repeating steps S1-S4 until the fluid pressure profile in the matrix rock is converged;

step S5: using the fracture geometry and the fluid pressure in the hydraulic fractures and the fluid pressure in the natural fractures obtained in steps S1-S4 to calculate a fluid flow velocity in the hydraulic fractures and a fluid flow velocity in the natural fractures;

step S6: calculating an acid concentration profile in the hydraulic fractures and an acid concentration profile in the natural fractures according to the fluid flow velocity in the hydraulic fractures and the fluid flow velocity in the natural fractures in step S5;

step S7: calculating an acid etching width in the hydraulic fractures and an acid etching width in the natural fractures, and updating the fracture geometry of the natural fractures and the fracture geometry of the hydraulic fractures according to the acid concentration profile in the hydraulic fractures and the acid concentration profile in the natural fractures obtained in step S6;

step S8: calculating a growth rate of the acid-etched wormhole, and further calculating a length of acid-etched wormhole according to the acid concentration profile in the hydraulic fractures and the acid concentration profile in the natural fractures obtained in step S6 and the average filtration velocity obtained in step S1; and updating a permeability of matrix rock based on the calculated length of acid-etched wormhole; and step S9: bringing the calculated fracture geometry of the natural fractures and the fracture geometry of the hydraulic fractures, the fluid pressure profile in the natural fractures and the fluid pressure profile in the hydraulic fractures, and the permeability of the matrix rock as initial parameters into step S1, and repeating steps S1-S8 until the end of the calculation.

Preferably, in step S1, the equations of the fluid filtration to natural fractures and the matrix rock, and the average fluid filtration velocity in the fracture propagation grid are:

1) the fluid filtration to natural fractures is:

$$V_{inf}(x,t) = 2\int_0^{\Delta t}\int_0^{h_{pay}}\int_0^{L_{nf}} u_{inf}(y,z,t_p)dydzdt + \tag{1}$$

$$\int_0^{\Delta t}\int_0^{h_{pay}}\int_0^{L_{nf}} \frac{\partial w_{nf}(y,z,t_p)}{\partial t}dydzdt;$$

$$u_{inf}(y,z,t_p) = \frac{k_{mx}(y,z,t_p)}{\mu}\frac{p_{nf}(y,z,t_p)-p_m(y,z,t_p)}{\partial x}; \tag{2}$$

the fluid pressure in the natural fracture is:

$$\frac{\partial}{\partial y}\left(\frac{w_{nf}^3}{12\mu}\frac{\partial p_{nf}}{\partial y}\right) + \frac{\partial}{\partial z}\left(\frac{w_{nf}^3}{12\mu}\frac{\partial p_{nf}}{\partial z}\right) + 2u_{inf} + \frac{\partial w_{nf}}{\partial t} = 0; \tag{3}$$

2) the fluid filtration to matrix rock is:

$$v_{lm}(x,z,t_p) = \frac{k_{my}(x,z,t_p)}{\mu}\frac{p_{hf}(x,t_p)-p_m(x,z,t_p)}{\partial y}; \tag{4}$$

$$V_{lm}(x,t) = 2\int_0^{\Delta t}\int_0^{h_{hf}(x)} \Delta x v_{lm}(x,z,t_p)dzdt; \tag{5}$$

3) the average filtration velocity is:

$$v_L(x,t) = \frac{V_{lm}(x,t)+V_{inf}(x,t)}{A_m(x)\Delta t}. \tag{6}$$

In the formula, $V_{inf}$ is the volume of acid filtrates into the natural fracture, m³; $V_{lm}$ is the volume of acid filtrates into the matrix, m³; $\Delta t$ is the calculation time step, s; $\Delta t_p$ is hydraulic fracture propagation time step, s. $h_{pay}$ is reservoir height, m; $h_{hf}$ is the height of hydraulic fracture, m; $L_{hf}$ is the natural fracture length, m; $u_{inf}$ is the fluid filtration velocity from natural fracture to matrix, m/s; x is the coordinate of reservoir length direction, m; y is the coordinate of reservoir width direction, m; z is the coordinate of reservoir height direction, m; $w_{hf}$ is hydraulic fracture width, m; $w_{nf}$ is natural fracture width, m; $v_{lm}$ is the acid filtration velocity from the hydraulic fracture to matrix, m/s; $v_L$ is the average filtration velocity of acid in hydraulic fracture, m/s; $k_{mx}$ and $k_{my}$ are the permeability of matrix rock in directions x and y, m²; $\mu$ is fluid viscosity, Pa·s; $p_{hf}$ is the fluid pressure in hydraulic fracture, pa; $p_{nf}$ is the fluid pressure in natural fracture, pa; $p_m$ is the fluid pressure in the matrix rock, pa; and $A_m$ is the filtration area of hydraulic fracture, m².

Preferably, in step S2, the fluid pressure in the hydraulic fractures and geometry of the hydraulic fractures are iteratively calculated by the following equation:

$$\frac{\partial}{\partial x}\left(\frac{A_{hf}w_{hf}^2}{12\mu}\frac{\partial p_{hf}}{\partial x}\right) = 2h_{hf}v_L + \frac{\partial A_{hf}}{\partial t_p}; \tag{7}$$

$$w_{hf}(z) = \frac{4}{G}(p_{hf}-\sigma_3)\sqrt{z(h_{hf}-z)} + \frac{4}{\pi G}\sum_{i=1}^{2}(\sigma_{i+1}-\sigma_i). \tag{8}$$

$$\left[(h_i-z)\cosh^{-1}\left(\frac{z}{|z-h_i|}\frac{h_{hf}-2h_i}{h_{hf}} + \frac{h_i}{|z-h_i|}\right) + \sqrt{z(h_{hf}-z)}\cos^{-1}\left(\frac{h_{hf}-2h_i}{h_{hf}}\right)\right]$$

In the formula, $A_{hf}$ is hydraulic fracture cross-sectional area, m²; $h_i$ is the hydraulic fracture height in layer i, m; G is shear modulus of reservoir rock, pa; $\sigma_i$ is the minimum horizontal stress in layer i, i=1,2,3, pa.

Preferably, in step S3, the pressure profile calculation equation in the matrix rock is:

$$\rho_1\frac{\partial}{\partial x}\left(\frac{k_{mx}}{\mu}\frac{\partial p_m}{\partial x}\right) + \rho_1\frac{\partial}{\partial y}\left(\frac{k_{my}}{\mu}\frac{\partial p_m}{\partial y}\right) + \rho_1\frac{\partial}{\partial z}\left(\frac{k_{mz}}{\mu}\frac{\partial p_m}{\partial z}\right) = \tag{9}$$

$$\phi C_t\rho_1\frac{\partial p_m}{\partial t} + q_1.$$

In the formula, $k_{mx}$ and $k_{mz}$ are the permeability of matrix rock in directions x and z, m²; $\phi$ is the porosity of matrix rock, dimensionless; $C_t$ is the comprehensive compression coefficient of matrix rock, Pa⁻¹; $\rho_1$ is fluid density, kg/m³; and $q_1$ is the source term caused by fluid filtration into matrix rock from fracture, kg·m⁻³·s⁻¹.

Preferably, in step S4, the threshold value of convergence criterion ranges from one thousandth to one ten-thousandth.

Preferably, in step S5, the fluid flow velocity distribution equation includes:

1) the hydraulic fracture flow equation is:

$$u_x = -\frac{w_{hf}^2}{12\mu}\frac{\partial p_{hf}}{\partial x}, u_z = -\frac{w_{hf}^2}{12\mu}\frac{\partial p_{hf}}{\partial y}; \tag{10}$$

2) the natural fracture flow equation is:

$$v_y = -\frac{w_{nf}^2}{12\mu}\frac{\partial p_{nf}}{\partial y}, v_z = -\frac{w_{nf}^2}{12\mu}\frac{\partial p_{nf}}{\partial z}. \tag{11}$$

In the formula, $u_x$ and $u_z$ are the acid flow velocity in the length and height directions in hydraulic fracture, m/s; $v_y$ and $v_z$ are the acid flow velocity in the length and height directions in natural fracture, m/s.

Preferably, in step S6, the acid concentration profile equation in natural fracture and hydraulic fracture includes:

1) calculation equation of acid concentration in hydraulic fracture:

$$\frac{\partial(u_x w_{hf} C_{hf})}{\partial x} + \frac{\partial(u_z w_{hf} C_{hf})}{\partial z} - \tag{16}$$

$$2\frac{k_c k_g}{(k_c+k_g)}C_{hf} - 2C_{hf}v_L + \frac{\partial w_{hf}C_{hf}}{\partial t} = 0;$$

2) calculation equation of acid concentration in natural fracture:

$$\frac{\partial(v_y w_{nf} C_{nf})}{\partial y} + \frac{\partial(v_z w_{nf} C_{nf})}{\partial z} - 2\frac{k_c k_g}{(k_c + k_g)} C_{nf} - 2 C_{nf} u_{brf} + \frac{\partial w_{nf} C_{nf}}{\partial t} = 0. \quad (17)$$

In the formula, $C_{nf}$ and $C_{hf}$ are the average acid concentration in the width direction of natural fractures and hydraulic fractures, mol/m$^3$; $k_g$ is the mass transfer coefficient of acid, m/s; $k_c$ is the acid-rock reaction rate constant, m$^2$/s.

Preferably, in step S7, the calculation method for updating the width of hydraulic fracture and natural fracture is as follows:

calculation method for updating the width in hydraulic fracture:

$$w_{hf}^{n+1} = w_{hf}^n + \frac{2\beta M \frac{k_c k_g}{(k_c + k_g)} C_{hf}}{\rho_r (1 - \phi)} \Delta t; \quad (18)$$

calculation method for updating the width in natural fracture:

$$w_{nf}^{n+1} = w_{nf}^n + \frac{2\beta M \left[ u_{brf} C_{nf} + \frac{k_c k_g}{(k_c + k_g)} C_{nf} \right]}{\rho_r (1 - \phi)} \Delta t. \quad (19)$$

In the formula, $\beta$ is the dissolution ability of acid to rock, kg/kg; $\rho_r$ is matrix rock density, kg/m$^3$; M is the molar mass of acid, kg/mol; $w_{hf}^{n+1}$ and $w_{hf}^n$ are the hydraulic fracture width after and before update, m; $w_{nf}^{n+1}$ and $w_{nf}^n$ are the natural fracture width after and before update, m.

Preferably, in step S8, the growth rate calculation equation of acid-etched wormhole is:

$$v_{wh} = v_{i,tip} N_{Ac} \times \left( \frac{v_{i,tip} PV_{bt,opt} N_{AC}}{v_{i,opt}} \right)^{-0.3} \times \left\{ 1 - \exp\left[ -4 \left( \frac{v_{i,tip} PV_{bt,opt} N_{AC} Y}{v_{i,opt} r_{wh}} \right)^2 \right] \right\}^2. \quad (20)$$

In the formula, $v_{wh}$ is the growth rate of wormhole, m/s; $v_{i,tip}$ is the acid flow velocity at the tip of wormhole, m/s; $PV_{bt,opt}$ is the optimal wormhole breakthrough volume, dimensionless; $N_{AC}$ is the number of acid dissolution capacity, dimensionless; $v_{i,opt}$ is the optimal acid flow rate at the tip of wormhole, m/s; Y is the reservoir width, m; and $r_{wh}$ is the length of wormhole area, m.

The invention has the following beneficial effects:

1. According to the invention, the dynamic filtration caused by natural fractures and acid-etched wormholes in the acid fracturing process is mainly considered, the considered filtration process is calculated by numerical method, and the acid etching profile of the acid-etched fracture system is finally obtained.

2. According to the invention, the etching of acid to hydraulic fracturing and natural fractures is calculated finely at the same time, and finally the etching profile of acid-etched fracture system is obtained. The principle is reliable and the calculation is efficient, which is conducive to accurately simulate the acid fracturing process in naturally fractured carbonate reservoirs and improving the accuracy of optimization of acid fracturing treatment parameters. This invention has guiding significance for the acid fracturing design in naturally fractured carbonate reservoirs.

BRIEF DESCRIPTION OF THE DRAWINGS

In order to explain the technical scheme of the embodiments of the present invention more clearly, the drawings of the embodiments will be briefly introduced below. Obviously, the drawings in the following description only refer to some embodiments of the present invention, but do not limit the present invention.

DESCRIPTION OF THE PREFERRED EMBODIMENTS

Figure 1:
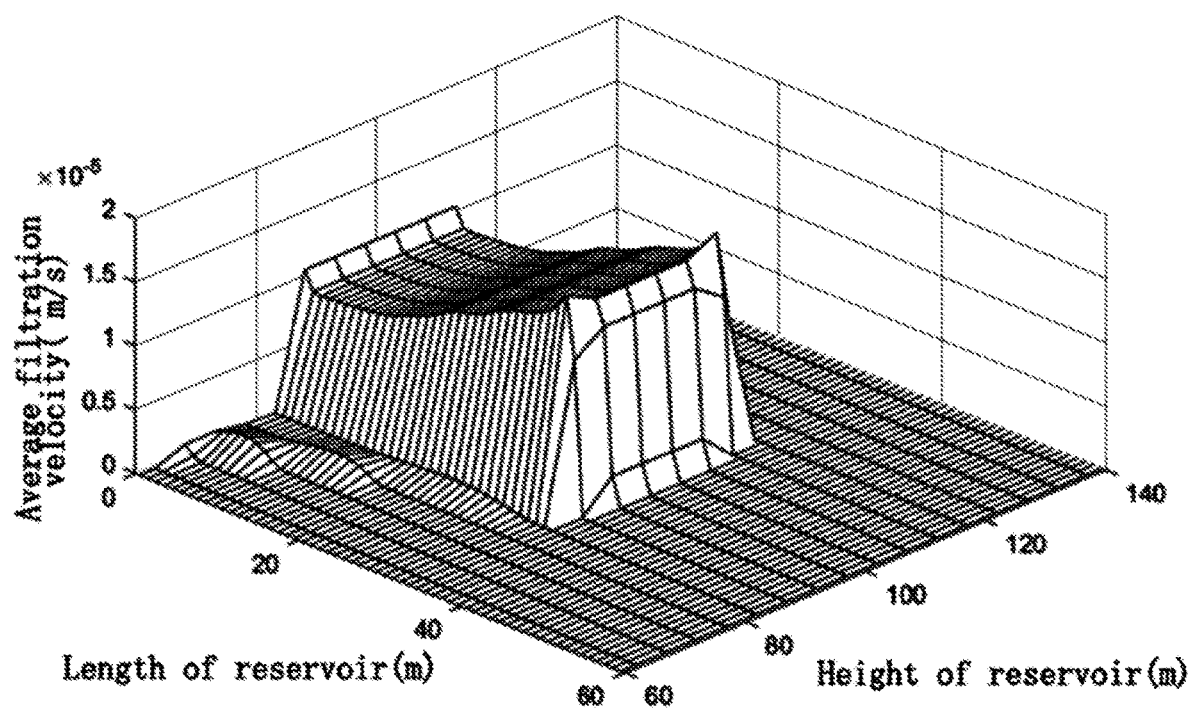
FIG. 1 is a schematic diagram of average filtration velocity in fracture propagation grid after a certain calculation time step of the present invention.

In order to make the purpose, technical scheme and advantages of embodiments of the present invention clearer, the technical scheme of embodiments of the present invention will be described clearly and completely with reference to the drawings of embodiments of the present invention. Obviously, the described embodiments are some embodiments of the present invention, but not all embodiments. Based on the described embodiments of the present invention, all other embodiments obtained by ordinary technicians in the field without creative labor belong to the scope of protection of the present invention.

Unless otherwise defined, the technical terms or scientific terms used in this disclosure shall have the ordinary meaning understood by those with ordinary skills in the field to which this disclosure belongs. As used in this disclosure, similar words such as "including" mean that the elements or articles appearing before the word cover the listed elements or articles appearing after the word and their equivalents, without excluding other elements or articles. "Upper", "lower", "left" and "right" are only used to express the relative positional relationship. When the absolute position of the described object changes, the relative positional relationship may change accordingly.

The invention will be further explained with reference to drawings and examples.

As shown in FIG. 1 to FIG. 10, a method of calculating etching profile of acid-etched fracture system considering complex filtration media includes the following steps: Collect basic parameters of acid fracturing design of wells in the target work area for calculating etching profile of acid-etched fracture system.

Step S1: the filtration volume of acid to natural fractures and matrix rock is estimated within the estimated time step, and the average filtration velocity in the fracture propagation grid is calculated based on the assumed matrix rock pressure.

1. The fluid filtration to natural fractures: according to material balance, filtration volume of acid to natural fractures equals to volume change of natural fractures add fluid filtration from natural fractures to the matrix rock;

$$V_{lnf}(x,t) = 2\int_0^{\Delta t}\int_0^{h_{pay}}\int_0^{L_{nf}} u_{lnf}(y,z,t_p)dydzdt + \int_0^{\Delta t}\int_0^{h_{pay}}\int_0^{L_{nf}} \frac{\partial w_{nf}(y,z,t_p)}{\partial t}dydzdt; \quad (1)$$

$$u_{lnf}(y,z,t_p) = \frac{k_{mx}(y,z,t_p)}{\mu}\frac{p_{nf}(y,z,t_p) - p_m(y,z,t_p)}{\partial x}. \quad (2)$$

The fluid pressure $p_{nf}$ in the natural fracture is calculated by the following formula:

$$\frac{\partial}{\partial y}\left(\frac{w_{nf}^3}{12\mu}\frac{\partial p_{nf}}{\partial y}\right) + \frac{\partial}{\partial z}\left(\frac{w_{nf}^3}{12\mu}\frac{\partial p_{nf}}{\partial z}\right) + 2u_{lnf} + \frac{\partial w_{nf}}{\partial t} = 0. \quad (3)$$

2. The fluid filtration to matrix rock is:

$$v_{lm}(x,z,t_p) = \frac{k_{my}(x,z,t_p)}{\mu}\frac{p_{hf}(x,t_p) - p_m(x,z,t_p)}{\partial y}; \quad (4)$$

$$V_{lm}(x,t) = 2\int_0^{\Delta t}\int_0^{h_{hf}(x)} \Delta x v_{lm}(x,z,t_p)dzdt. \quad (5)$$

3. The average filtration velocity is:

$$v_L(x,t) = \frac{V_{lm}(x,t) + V_{lnf}(x,t)}{A_m(x)\Delta t}. \quad (6)$$

In the formula, $V_{lnf}$ is the volume of acid filtrates into the natural fracture, $m^3$; $V_{lm}$ is the volume of acid filtrates into the matrix, $m^3$; $\Delta t$ is the calculation time step, s; $\Delta t_p$ is hydraulic fracture propagation time step, s. $h_{pay}$ is reservoir height, m; $h_{hf}$ is the height of the hydraulic fractures, m; $L_{hf}$ is the natural fracture length, m; $u_{lnf}$ is the fluid filtration velocity from natural fracture to the matrix rock, m/s; x is the coordinate of reservoir length direction, m; y is the coordinate of reservoir width direction, m; z is the coordinate of reservoir height direction, m; $w_{hf}$ is hydraulic fracture width, m; $w_{nf}$ is natural fracture width, m; $v_{lm}$ is the acid filtration velocity from the hydraulic fracture to matrix rock, m/s; $v_L$ is the average filtration velocity of acid in the hydraulic fractures, m/s; $k_{mx}$ and $k_{my}$ are the permeability of the matrix rock in directions x and y, $m^2$; $\mu$ is fluid viscosity, Pa·s; $p_{hf}$ is the fluid pressure in hydraulic fracture, pa; $p_{nf}$ is the fluid pressure in natural fractures, pa; $p_m$ is the fluid pressure in the matrix rock, pa; and $A_m$ is the filtration area of hydraulic fracture, $m^2$.

Step S2: based on the average filtration velocity in step S1, a hydraulic fracture propagation mode (Fung, R. L., Vilayakumar, S., & Cormack, D. E. (1987, Dec. 1). Calculation of Vertical Fracture Containment in Layered Formations. Society of Petroleum Engineers. doi:10.2118/14707-PA) is used to calculate the fluid pressure in hydraulic fracture, and further calculate the fracture geometry of the hydraulic fractures. The fluid pressure and the fracture geometry of the hydraulic fractures are obtained by iterative calculation of formulas (7)-(8):

$$\frac{\partial}{\partial x}\left(\frac{A_{hf}w_{hf}^2}{12\mu}\frac{\partial p_{hf}}{\partial x}\right) = 2h_{hf}v_L + \frac{\partial A_{hf}}{\partial t_p}; \quad (7)$$

$$w_{hf}(z) = \frac{4}{G}(p_{hf} - \sigma_3)\sqrt{z(h_{hf}-z)} + \frac{4}{\pi G}\sum_{i=1}^{2}(\sigma_{i+1} - \sigma_i) \quad (8)$$

$$\left[(h_i - z)\cosh^{-1}\left(\frac{z}{|z-h_i|}\frac{h_{hf} - 2h_i}{h_{hf}} + \frac{h_i}{|z-h_i|}\right) + \sqrt{z(h_{hf}-z)}\cos^{-1}\left(\frac{h_{hf} - 2h_i}{h_{hf}}\right)\right].$$

In the formula, $A_{hf}$ is hydraulic fracture cross-sectional area, $m^2$; $h_i$ is the hydraulic fracture height in layer i, m; G is shear modulus of reservoir rock, pa; $\sigma_i$ is the minimum horizontal stress in layer i, i=1,2,3, pa.

Step S3: according to the fracture geometry and the fluid pressure in the hydraulic fractures obtained in step S2, the pressure distribution in the matrix rock is calculated by formula (9):

$$\rho_1\frac{\partial}{\partial x}\left(\frac{k_{mx}}{\mu}\frac{\partial p_m}{\partial x}\right) + \rho_1\frac{\partial}{\partial y}\left(\frac{k_{my}}{\mu}\frac{\partial p_m}{\partial y}\right) + \rho_1\frac{\partial}{\partial z}\left(\frac{k_{mz}}{\mu}\frac{\partial p_m}{\partial z}\right) = \phi C_t\rho_1\frac{\partial p_m}{\partial t} + q_1. \quad (9)$$

In the formula, $k_{mx}$ and $k_{mz}$ are the permeability of the matrix rock in directions x and z, $m^2$; $\phi$ is the porosity of matrix rock, dimensionless; $C_t$ is the comprehensive compression coefficient of the matrix rock, $Pa^{-1}$; $\rho_1$ is fluid density, $kg/m^3$; and $q_1$ is the source term caused by fluid filtration into the matrix rock from fracture, $kg \cdot m^{-3} \cdot s^{-1}$.

Step S4: comparing the fluid pressure profile in the matrix rock calculated in step S3 with the assumed fluid pressure profile in step S1; if it does not match the convergence criterion, taking the fluid pressure profile in the matrix rock calculated in step S3 as the assumed pressure into step S1, and repeating steps S1-S4 until the fluid pressure profile in the matrix rock is converged.

Step S5: calculating the fluid flow velocity in the natural fractures and the hydraulic fracture according to formulas (10)-(11) by using the fracture geometry and the fluid pressure in the hydraulic fractures and the natural fracture obtained in steps S1-S4. For the flow between two parallel plates, the fluid velocity can be estimated by the law of cube:

1) the hydraulic fracture flow equation is:

$$u_x = -\frac{w_{hf}^2}{12\mu}\frac{\partial p_{hf}}{\partial x}, u_z = -\frac{w_{hf}^2}{12\mu}\frac{\partial p_{hf}}{\partial y}; \quad (10)$$

2) the natural fracture flow equation is:

$$v_y = -\frac{w_{nf}^2}{12\mu}\frac{\partial p_{nf}}{\partial y}, v_z = -\frac{w_{nf}^2}{12\mu}\frac{\partial p_{nf}}{\partial z}. \quad (11)$$

In the formula, $u_x$ and $u_z$ are the acid flow velocity in the length and height directions in hydraulic fracture, m/s; $v_y$ and $v_z$ are the acid flow velocity in the length and height directions in natural fracture, m/s.

Step S6: according to the fluid flow velocity obtained in step S5, calculate the acid concentration in the natural fractures and the hydraulic fracture.

1) Calculation equation of acid concentration in the hydraulic fractures:

$$\frac{\partial(u_x w_{hf} C_{hf})}{\partial x} + \frac{\partial(u_z w_{hf} C_{hf})}{\partial z} - 2\frac{k_c k_g}{(k_c+k_g)}C_{hf} - 2C_{hf}v_L + \frac{\partial w_{hf} C_{hf}}{\partial t} = 0. \quad (16)$$

2) Calculation equation of acid concentration in the natural fractures:

$$\frac{\partial(v_y w_{nf} C_{nf})}{\partial y} + \frac{\partial(v_z w_{nf} C_{nf})}{\partial z} - 2\frac{k_c k_g}{(k_c+k_g)}C_{nf} - 2C_{nf}u_{lnf} + \frac{\partial w_{nf} C_{nf}}{\partial t} = 0. \quad (17)$$

In the formula, $C_{nf}$ and $C_{hf}$ are the average acid concentration in the width direction of the natural fractures and the hydraulic fracture, mol/m³; $k_g$ is the mass transfer coefficient of acid, m/s; $k_c$ is the acid-rock reaction rate constant, m²/s.

Step S7: according to the acid concentration profile obtained in step S6, calculate the acid etching width of the hydraulic fractures and natural fractures, and update the geometry of the natural fractures and the fracture geometry of the hydraulic fractures.

The width updating calculations of hydraulic fracture and natural fractures are as follows:

calculation for updating the width in hydraulic fracture:

$$w_{hf}^{n+1} = w_{hf}^n + \frac{2\beta M \frac{k_c k_g}{(k_c+k_g)} C_{hf}}{\rho_r(1-\phi)}\Delta t; \quad (18)$$

calculation for updating the width in natural fractures:

$$w_{nf}^{n+1} = w_{nf}^n + \frac{2\beta M\left[u_{lnf}C_{nf} + \frac{k_c k_g}{(k_c+k_g)}C_{nf}\right]}{\rho_r(1-\phi)}\Delta t. \quad (19)$$

In the formula, $\beta$ is the dissolution ability of acid to the matrix rock, kg/kg; $\rho_r$ is matrix rock density, kg/m³; M is the molar mass of acid, kg/mol; $w_{hf}^{n+1}$ and $w_{hf}^n$ are the hydraulic fracture width after and before update, m; $w_{nf}^{n+1}$ and $w_{nf}^n$ are the natural fracture width after and before update, m.

Step S8: according to the acid concentration profile and the average filtration velocity obtained by calculation, calculate the growth rate of acid-etched wormholes, and further calculate the length of the acid-etched wormhole; update the permeability profile of the matrix rock based on the calculated length of acid-etched wormholes.

The growth rate calculation equation of acid-etched wormholes is as follows:

$$v_{wh} = v_{i,tip}N_{Ac} \times \left(\frac{v_{i,tip}PV_{bt,opt}N_{AC}}{v_{i,opt}}\right)^{-0.3} \times \left\{1 - \exp\left[-4\left(\frac{v_{i,tip}PV_{bt,opt}N_{AC}Y}{v_{i,opt}r_{wh}}\right)^2\right]\right\}^2. \quad (20)$$

In the formula, $v_{wh}$ is the growth rate of wormhole, m/s; $v_{i,tip}$ is the acid flow velocity at the tip of wormhole, m/s; $PV_{bt,opt}$ is the optimal wormhole breakthrough volume, dimensionless; $N_{AC}$ is the number of acid dissolution capacity, dimensionless; $v_{i,opt}$ is the optimal acid flow rate at the tip of wormhole, m/s; Y is the reservoir width, m; and $r_{wh}$ is the length of wormhole area, m.

Step S9: bringing the calculated geometry of the natural fractures and the fracture geometry of the hydraulic fractures, fluid pressure in natural fractures and hydraulic fracture, and matrix rock permeability as initial parameters into step S1, and repeating steps S1-S8 until the end of the calculation.

Example Calculation

Collect basic parameters of acid fracturing design of wells in the target work area, as shown in Table 1, and use them to calculate the etching profile of acid-etched fracture system.

TABLE 1

Basic parameters of acid fracturing design for wells in target work area

| Parameter Name | Unit | Value | Parameter Name | Unit | Value |
|---|---|---|---|---|---|
| Matrix rock fluid pressure, $\rho_m$ | Pa | $4 \times 10^7$ | Minimum horizontal stress in production layer, $\sigma_2$ | Pa | $5 \times 10^7$ |
| Comprehensive compression coefficient of | Pa⁻¹ | $2.2 \times 10^{-9}$ | Minimum horizontal stress in interlayer, $\sigma_{1,3}$ | Pa | $5.8 \times 10^7$ |

TABLE 1-continued

Basic parameters of acid fracturing design for wells in target work area

| Parameter Name | Unit | Value | Parameter Name | Unit | Value |
|---|---|---|---|---|---|
| reservoir, $C_t$ | | | Height of reservoir, $h_{pay}$ | m | 30 m |
| Viscosity of fluid, $\mu$ | Pa·s | 0.01 | Reservoir Length, L | m | 500 |
| Width of reservoir, $\gamma$ | m | 500 | Acid mass transfer coefficient, $k_g$ | m/s | $4 \times 10^{-5}$ |
| Fluid density, $\rho_l$ | kg/m$^3$ | 1100 | | | |
| Reservoir rock density, $\rho_r$ | kg/m$^3$ | 2600 | Acid rock reaction rate constant, $k_c$ | m$^2$/s | $6.8 \times 10^{-5}$ |
| Acid concentration at hydraulic fracture inlet, $c_0$ | mol/m$^3$ | 6020 | Matrix rock permeability in direction x, $k_{mx}$ | m$^2$ | $1 \times 10^{-15}$ |
| Matrix rock permeability in direction y, $k_{my}$ | m$^2$ | $1 \times 10^{-15}$ | Matrix rock permeability in direction z, $k_{mz}$ | m$^2$ | $0.1 \times 10^{-15}$ |

Figure 2:
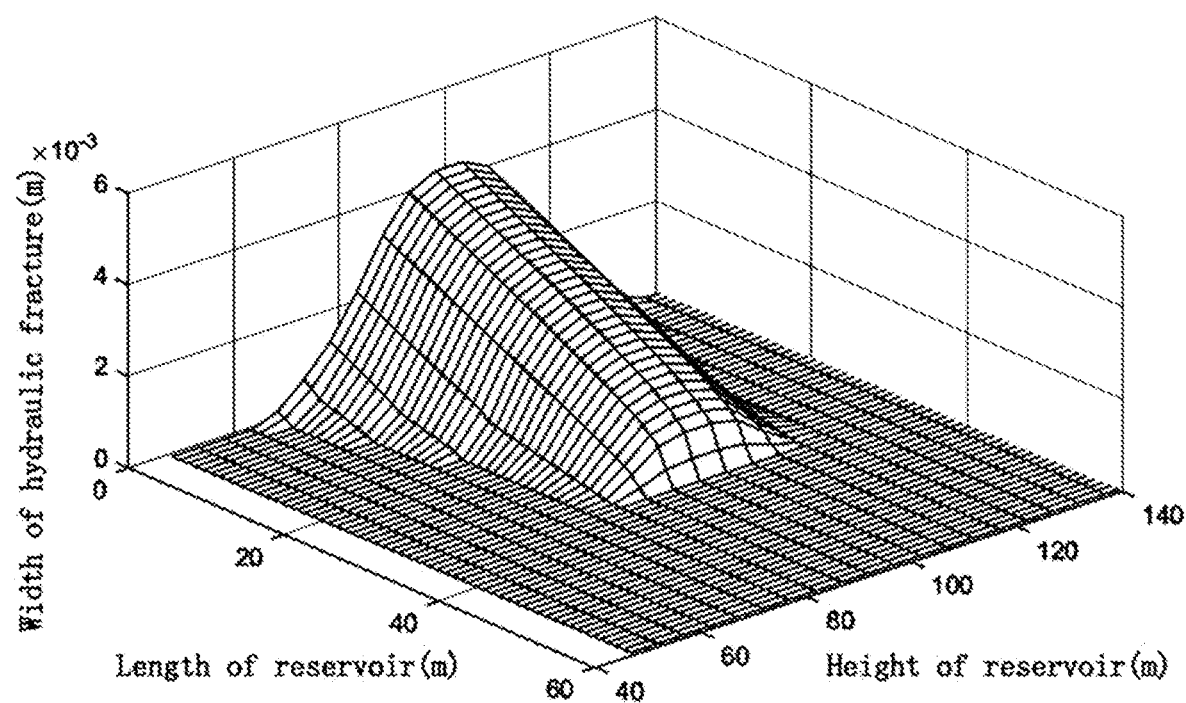
FIG. 2 is a schematic diagram of fracture geometry after a certain calculation time step of the present invention.
Figure 3:
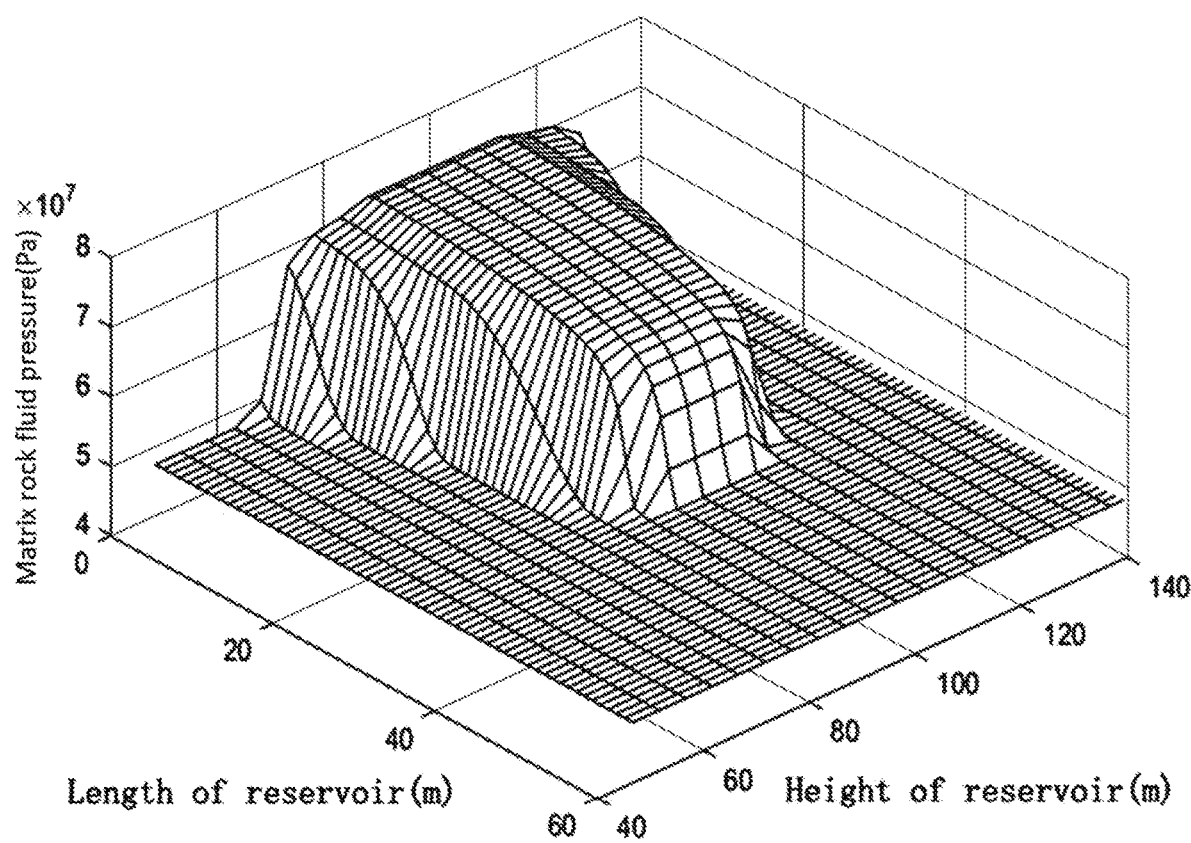
FIG. 3 is a schematic diagram of the pressure profile in the first layer grid of the matrix rock after a certain calculation time step of the present invention.

Firstly, calculate the average filtration velocity, fracture geometry, fluid pressure in hydraulic fracture and fluid pressure in matrix rock in fracture propagation grid at the end of time step t through steps S1-S4, as are shown in FIG. 1 to FIG. 3.

Figure 4:
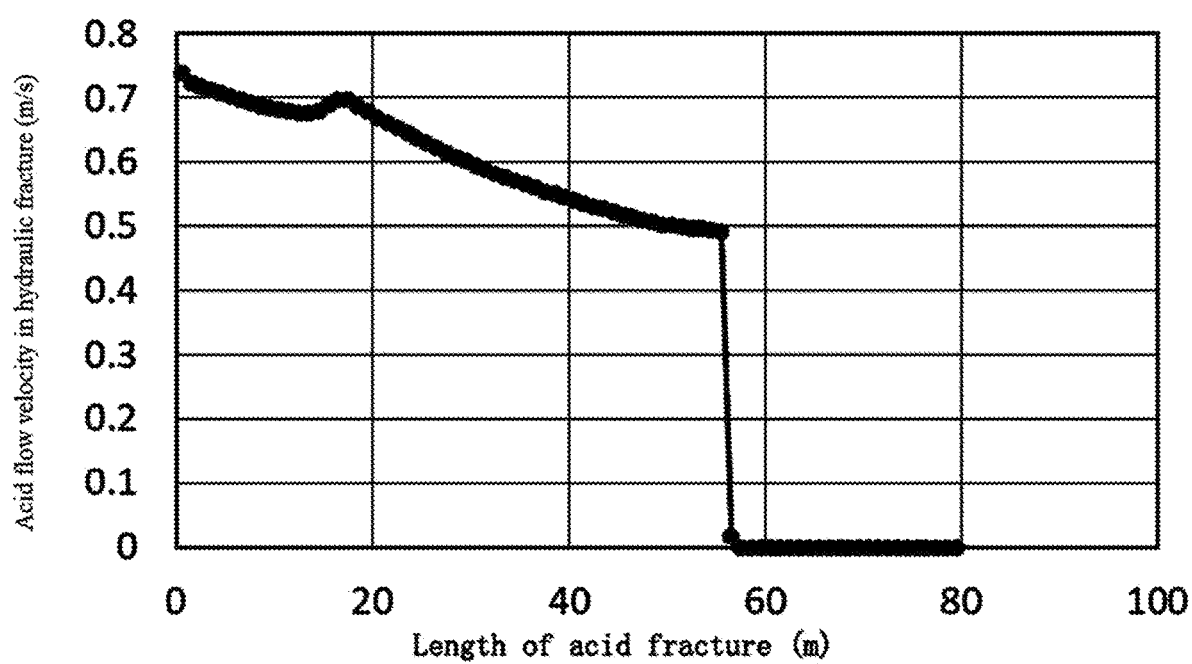
FIG. 4 is a schematic diagram of fluid flow velocity profile in hydraulic fracture after a certain calculation time step of the present invention.
Figure 5:
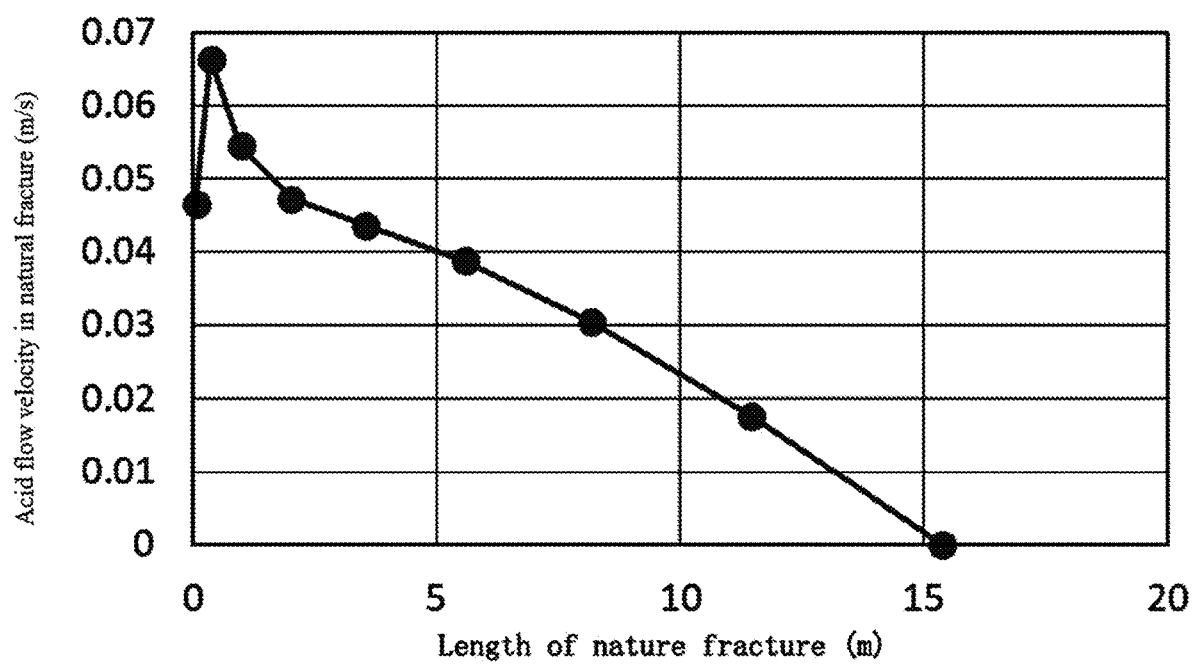
FIG. 5 is a schematic diagram of fluid flow velocity profile in natural fracture after a certain calculation time step of the present invention.

Calculate the fluid flow velocity in the hydraulic fractures and the natural fractures through step S5, as are shown in FIG. 4 to FIG. 5.

Figure 6:
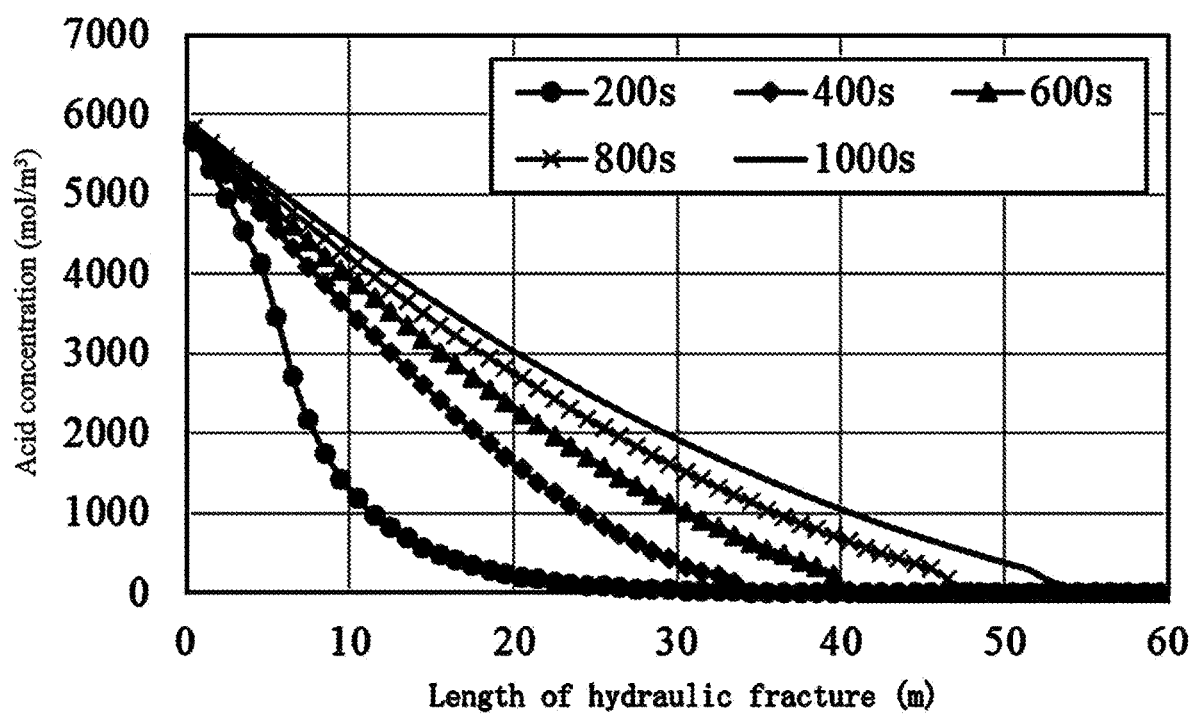
FIG. 6 is a schematic diagram of acid concentration profile in hydraulic fracture under different acid injection time steps.

Calculate the acid concentration in the natural fractures and the hydraulic fracture according to the fluid flow velocity in step S5 through step S6, as is shown in FIG. 6.

Figure 7:
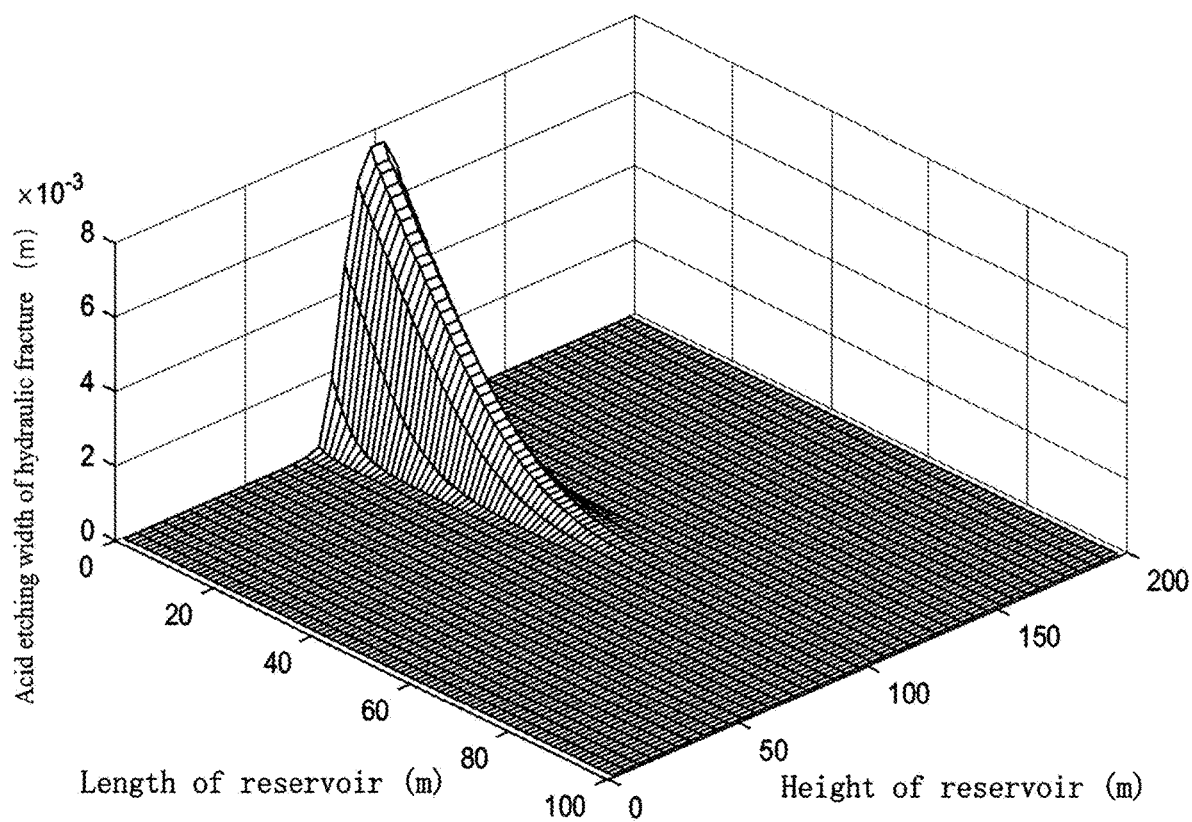
FIG. 7 is a schematic diagram of the acid etching width profile in hydraulic fracture after a certain calculation time step of the present invention.
Figure 8:
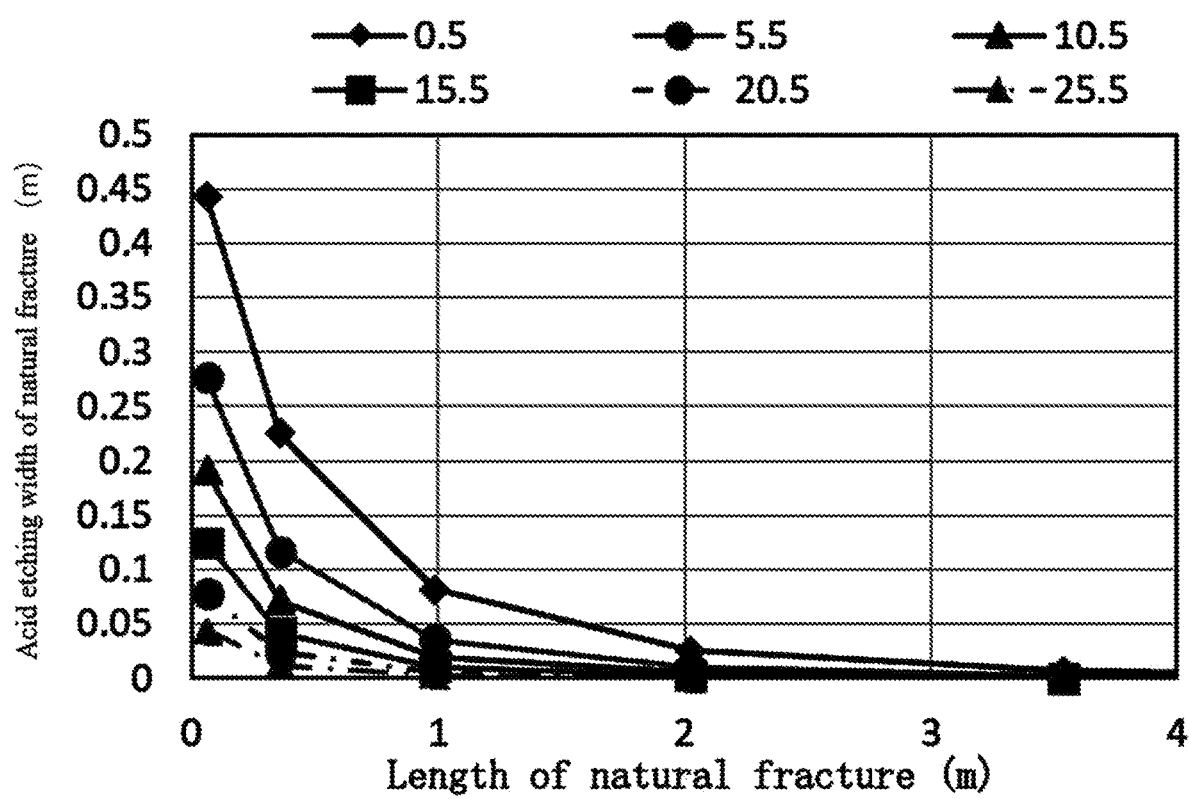
FIG. 8 is a schematic diagram of the acid etching width profile in natural fracture at different distance from the hydraulic fracture entrance after a certain calculation time step of the present invention.

Calculate acid etching widths in the hydraulic fractures and the natural fractures according to the results in step S7, and updating the geometry of the natural fractures and the fracture geometry of the hydraulic fractures, as are shown in FIGS. 7 and 8.

Figure 9:
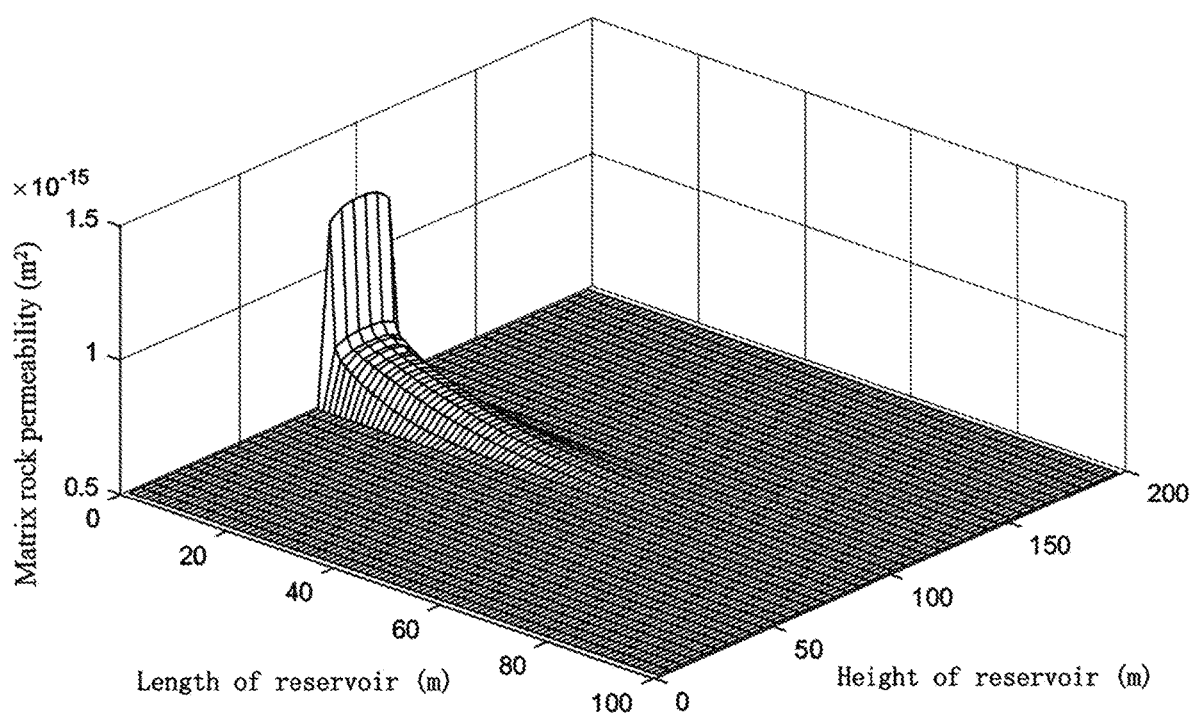
FIG. 9 is a schematic diagram of matrix rock permeability profile on the hydraulic fracture wall after a certain calculation time step of the present invention.
Figure 10:
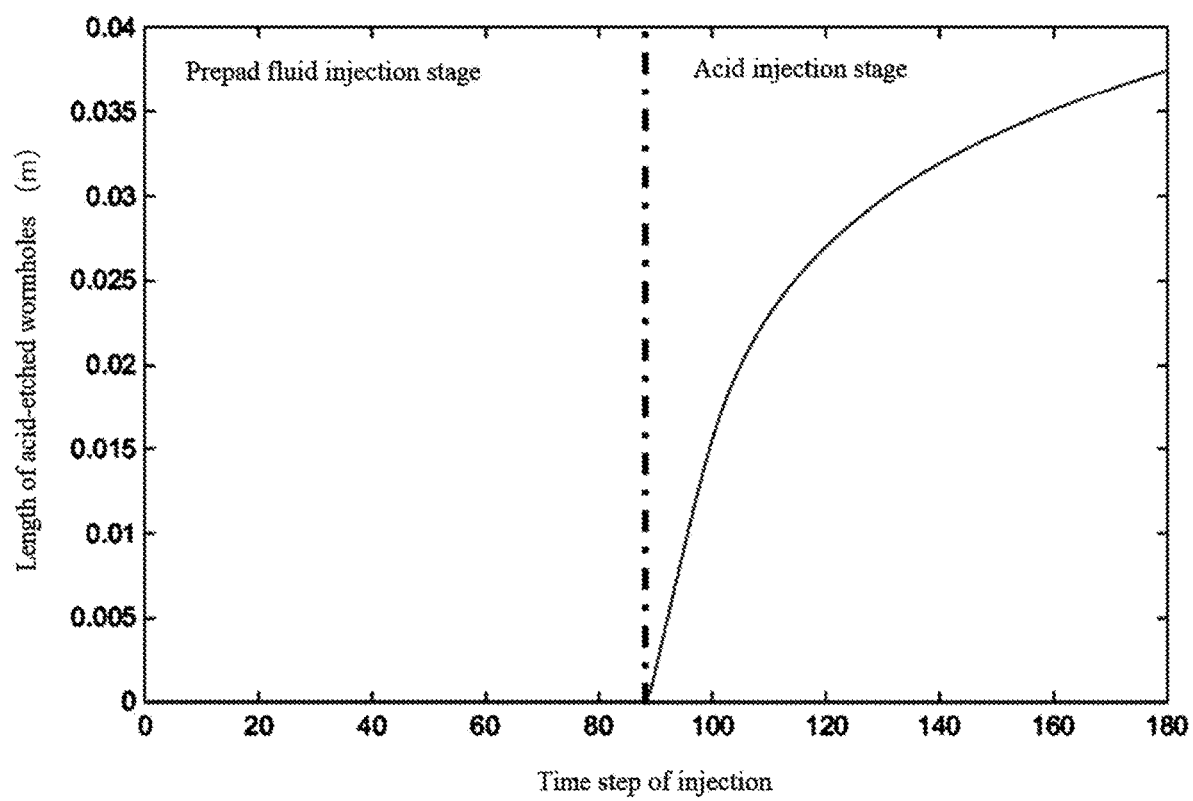
FIG. 10 is a schematic diagram showing the change of the length of acid-etched wormholes at the entrance of hydraulic fracture at different injection times.

Calculate the length of wormholes in different locations through step S8, and update the permeability of the matrix rock according to formulas (14) and (15), as are shown in FIG. 9 to FIG. 10.

Step S9: bringing the calculated geometry of the natural fractures and the fracture geometry of the hydraulic fractures, fluid pressure in natural fractures and hydraulic fracture, and the permeability of the matrix rock as initial parameters into step S1, and repeating steps S1-S8 until the end of the calculation.

Calculate the hydraulic fracture etching profile, natural fracture etching profile and acid-etched wormhole length of naturally-fractured carbonate reservoir after acid fracturing by repeating steps S1-S8.

In conclusion, the above is only a preferred embodiment of the present invention, and it does not limit the present invention in any form. Although the present invention has been disclosed as a preferred embodiment, it is not intended to limit the present invention. Any technical personnel familiar with this field, within the scope of the technical scheme of this invention, may change or modify the technical content of the disclosure as the equivalent embodiment, but any simple modification, equivalent change and modification of the above embodiment according to the technical essence of this invention shall still fall within the scope of the technical scheme of this invention.

The invention claimed is:
1. A method of calculating etching profile of an acid-etched fracture system considering complex filtration media, applied to acid fracturing in oil and gas exploration and development, comprising:
step S1: calculating a fluid pressure in natural fractures based on natural fracture fluid pressure model, further calculating a total filtration volume of acid to the natural fractures and a matrix rock in a time step, and calculating an average filtration velocity in a fracture propagation grid based on an assumed fluid pressure profile in the matrix rock;
step S2: calculating a fluid pressure in hydraulic fractures through a hydraulic fracture propagation model, and further calculating a fracture geometry of the hydraulic fractures and a fracture geometry of the natural fractures according to the average filtration velocity in step S1;
step S3: calculating a fluid pressure profile in the matrix rock according to the fracture geometry and the fluid pressure in the hydraulic fractures and the fluid pressure in natural fractures obtained in step S2;
step S4: comparing the fluid pressure profile in the matrix rock calculated in step S3 with the assumed fluid pressure profile in the matrix rock in step S1; if it does not match a convergence criterion, taking the fluid pressure profile in the matrix rock calculated in step S3 as the assumed fluid pressure profile into step S1, and repeating steps S1-S4 until the fluid pressure profile in the matrix rock is converged;
step S5: using the fracture geometry and the fluid pressure in the hydraulic fractures and the fluid pressure in the natural fractures obtained in steps S1-S4 to calculate a fluid flow velocity in the hydraulic fractures and a fluid flow velocity in the natural fractures;
step S6: calculating an acid concentration profile in the hydraulic fractures and an acid concentration profile in the natural fractures according to the fluid flow velocity in the hydraulic fractures and the fluid flow velocity in the natural fractures in step S5;
step S7: calculating an acid etching width in the hydraulic fractures and an acid etching width in the natural fractures, and updating the fracture geometry of the natural fractures and the fracture geometry of the hydraulic fractures according to the acid concentration profile in the hydraulic fractures and the acid concentration profile in the natural fractures obtained in step S6;
step S8: calculating a growth rate of an acid-etched wormhole, and further calculating a length of the acid-etched wormhole according to the acid concentration profile in the hydraulic fractures and the acid concentration profile in the natural fractures obtained in step S6 and the average filtration velocity obtained in step S1; and updating a permeability of the matrix rock based on the calculated length of the acid-etched wormhole; and step S9: bringing the calculated fracture geometry of the natural fractures and the fracture geometry of the hydraulic fractures, the fluid pressure profile in the natural fractures and the fluid pressure profile in the hydraulic fractures, and the permeability of the matrix rock as initial parameters into step S1, and repeating steps S1-S8 until the calculations in the steps S1-S8 are converged;

wherein equations of the fluid filtration of acid to the natural fractures and the matrix rock and the average fluid filtration velocity in the fracture propagation grid in step S1 are as follows:

1) the fluid filtration volume to the natural fractures is calculated by:

$$V_{lnf}(x,t) = 2\int_0^{\Delta t}\int_0^{h_{pay}}\int_0^{L_{nf}} u_{lnf}(y,z,t_p) dy dz dt + \quad (1)$$

$$\int_0^{\Delta t}\int_0^{h_{pay}}\int_0^{L_{nf}} \frac{\partial w_{nf}(y,z,t_p)}{\partial t} dy dz dt;$$

$$u_{lnf}(y,z,t_p) = \frac{k_{mx}(y,z,t_p)}{\mu}\frac{p_{nf}(y,z,t_p)-p_m(y,z,t_p)}{\partial x}; \quad (2)$$

the fluid pressure in the natural fractures is calculated by:

$$\frac{\partial}{\partial y}\left(\frac{w_{nf}^3}{12\mu}\frac{\partial p_{nf}}{\partial y}\right) + \frac{\partial}{\partial z}\left(\frac{w_{nf}^3}{12\mu}\frac{\partial p_{nf}}{\partial z}\right) + 2u_{lnf} + \frac{\partial w_{nf}}{\partial t} = 0; \quad (3)$$

2) the fluid filtration to the matrix rock is calculated by:

$$v_{lm}(x,z,t_p) = \frac{k_{my}(x,z,t_p)}{\mu}\frac{p_{hf}(x,t_p)-p_m(x,z,t_p)}{\partial y}; \quad (4)$$

$$V_{lm}(x,t) = 2\int_0^{\Delta t}\int_0^{h_{hf}(x)} \Delta x v_{lm}(x,z,t_p) dz dt; \quad (5)$$

3) the average filtration velocity is calculated by:

$$v_L(x,t) = \frac{V_{lm}(x,t)+V_{lnf}(x,t)}{A_m(x)\Delta t}; \quad (6)$$

in the formulas,
$V_{lnf}$ is the volume of acid filtrates into the natural fractures, m³;
$V_{lm}$ is the volume of acid filtrates into the matrix rock, m³;
$\Delta t$ is the calculation time step, s;
$\Delta t_p$ is the hydraulic fracture propagation time step, s;
$h_{pay}$ is a reservoir height, m;
$h_{hf}$ is a height of the hydraulic fractures, m;
$L_{hf}$ is a natural fracture length, m;
$u_{lnf}$ is the acid filtration velocity from the natural fractures to the matrix rock, m/s;
x is a coordinate of a reservoir length direction, m;
y is a coordinate of a reservoir width direction, m;
z is a coordinate of a reservoir height direction, m;
$w_{hf}$ the hydraulic fracture width, m;
$w_{nf}$ the natural fracture width, m;
$v_{lm}$ is the acid filtration velocity from the hydraulic fracture to the matrix rock, m/s;
$v_L$ is the average acid filtration velocity in the hydraulic fractures, m/s;

$k_{mx}$ and $k_{my}$ are the permeability of matrix rock in directions x and y, m²;
μ is the fluid viscosity, Pa·s;
$p_{hf}$ is the fluid pressure in the hydraulic fractures, pa;
$p_{nf}$ is the fluid pressure in the natural fractures, pa;
$p_m$ is the fluid pressure in the matrix rock, pa; and
$A_m$ is a filtration area of the hydraulic fractures, m².

2. The method of calculating etching profile of the acid-etched fracture system considering complex fluid filtration media according to claim 1, wherein the fluid pressure in the hydraulic fractures and the fracture geometry of the hydraulic fractures described in step S2 are obtained by iterative calculation of the following equations:

$$\frac{\partial}{\partial x}\left(\frac{A_{hf} w_{hf}^2}{12\mu}\frac{\partial p_{hf}}{\partial x}\right) = 2h_{hf} v_L + \frac{\partial A_{hf}}{\partial t_p}; \quad (7)$$

$$w_{hf}(z) = \frac{4}{G}(p_{hf}-\sigma_3)\sqrt{z(h_{hf}-z)} + \frac{4}{\pi G}\sum_{i=1}^{2}(\sigma_{i+1}-\sigma_i); \quad (8)$$

$$\left[(h_i-z)\cosh^{-1}\left(\frac{z}{|z-h_i|}\frac{h_{hf}-2h_i}{h_{hf}} + \frac{h_i}{|z-h_i|}\right) + \sqrt{z(h_{hf}-z)}\cos^{-1}\left(\frac{h_{hf}-2h_i}{h_{hf}}\right)\right]$$

in the formula,
$A_{hf}$ a hydraulic fracture cross-sectional area, m²;
$h_i$ is a hydraulic fracture height in layer i, m;
G is a shear modulus of reservoir rock, pa; and
$\sigma_i$ is a minimum horizontal stress in layer i, i=1, 2, 3, pa.

3. The method of calculating etching profile of the acid-etched fracture system considering complex fluid filtration media according to claim 1, wherein in step S3, the pressure profile in the matrix rock is calculated by:

$$\rho_1\frac{\partial}{\partial x}\left(\frac{k_{mx}}{\mu}\frac{\partial p_m}{\partial x}\right) + \rho_1\frac{\partial}{\partial y}\left(\frac{k_{my}}{\mu}\frac{\partial p_m}{\partial y}\right) + \rho_1\frac{\partial}{\partial z}\left(\frac{k_{mz}}{\mu}\frac{\partial p_m}{\partial z}\right) = \phi C_t \rho_1\frac{\partial p_m}{\partial t} + q_1; \quad (9)$$

in the formula,
$k_{mx}$ and $k_{mz}$ are the permeability of the matrix rock in directions x and z, m²;
$\phi$ is a porosity of the matrix rock, dimensionless;
$C_t$ is a comprehensive compression coefficient of the matrix rock, Pa$^{-1}$;
$\rho_1$ is a fluid density, kg/m³; and
$q_1$ is a source term caused by the fluid filtration into matrix rock from the natural fractures and the hydraulic fractures, kg m$^{-3}$·s$^{-1}$.

4. The method of calculating etching profile of the acid-etched fracture system considering complex fluid filtration media according to claim 1, wherein in step S4, a threshold value of convergence criterion ranges from one thousandth to one ten-thousandth.

5. The method of calculating etching profile of the acid-etched fracture system considering complex fluid filtration media according to claim 1, wherein in step S5, the fluid flow velocity is calculated by:

1) a hydraulic fracture flow equation:

$$u_x = -\frac{w_{hf}^2}{12\mu}\frac{\partial p_{hf}}{\partial x}, u_z = -\frac{w_{hf}^2}{12\mu}\frac{\partial p_{hf}}{\partial y}; \quad (10)$$

2) a natural fracture flow equation:

$$v_y = -\frac{w_{nf}^2}{12\mu}\frac{\partial p_{nf}}{\partial y}, v_z = -\frac{w_{nf}^2}{12\mu}\frac{\partial p_{nf}}{\partial z}; \quad (11)$$

in the formula, $u_x$ and $u_z$ are the acid flow velocity in the length and height directions in the hydraulic fractures, m/s; and $v_y$ and $v_z$ are the acid flow velocity in the length and height directions in the natural fractures, m/s.

6. The method of calculating etching profile of the acid-etched fracture system considering complex fluid filtration media according to claim 1, wherein in step S6, the acid concentration profile in natural fracture and the acid concentration profile of the hydraulic fractures are calculated by:

1) a calculation equation of the acid concentration in the hydraulic fractures:

$$\frac{\partial(u_x w_{hf} C_{hf})}{\partial x} + \frac{\partial(u_z w_{hf} C_{hf})}{\partial z} - 2\frac{k_c k_g}{(k_c + k_g)}C_{hf} - 2C_{hf}v_L + \frac{\partial w_{hf}C_{hf}}{\partial t} = 0; \quad (16)$$

2) a calculation equation of the acid concentration in the natural fracture:

$$\frac{\partial(v_y w_{nf} C_{nf})}{\partial y} + \frac{\partial(v_z w_{nf} C_{nf})}{\partial z} - 2\frac{k_c k_g}{(k_c + k_g)}C_{nf} - 2C_{nf}u_{lnf} + \frac{\partial w_{nf}C_{nf}}{\partial t} = 0; \quad (17)$$

in the formula, $C_{nf}$ and $C_{hf}$ are the average acid concentration in the width direction of the natural fractures and the hydraulic fractures, mol/m³;

$k_g$ is a mass transfer coefficient of acid, m/s; and $k_c$ is an acid-rock reaction rate constant, m²/s.

7. The method of calculating etching profile of the acid-etched fracture system considering complex fluid filtration media according to claim 1, wherein in step S7, calculations for updating the width of the hydraulic fractures and the natural fracture is as follows:

the calculation for updating the width in the hydraulic fractures:

$$w_{hf}^{n+1} = w_{hf}^n + \frac{2\beta M \frac{k_c k_g}{(k_c + k_g)}C_{hf}}{\rho_r(1-\phi)}\Delta t; \quad (18)$$

the calculation method for updating the width in the natural fractures:

$$w_{nf}^{n+1} = w_{nf}^n + \frac{2\beta M\left[u_{lnf}C_{nf} + \frac{k_c k_g}{(k_c + k_g)}C_{nf}\right]}{\rho_r(1-\phi)}\Delta t; \quad (19)$$

in the formula,

β is a dissolution ability of acid to rock, kg/kg;

$\rho_r$ is a matrix rock density, kg/m³;

M is a molar mass of acid, kg/mol;

$w_{hf}^{n+1}$ and $w_{hf}^n$ are the width of the hydraulic fractures after and before update, m; and $w_{nf}^{n+1}$ and $w_{nf}^n$ are the width of the natural fractures after and before update, m.

8. The method of calculating etching profile of the acid-etched fracture system considering complex fluid filtration media according to claim 1, wherein in step S8, a growth rate calculation equation of the acid-etched wormhole is:

$$v_{wh} = v_{i,tip}N_{AC} \times \left(\frac{v_{i,tip}PV_{bt,opt}N_{AC}}{v_{i,opt}}\right)^{-0.3} \times \left\{1 - \exp\left[-4\left(\frac{v_{i,tip}PV_{bt,opt}N_{AC}Y}{v_{i,opt}r_{wh}}\right)^2\right]\right\}^2; \quad (20)$$

$$\text{Dimension} = \frac{m}{s} = \frac{m}{s}\cdot\left(\frac{m}{s}\frac{s}{m}\right)$$

in the formula, $v_{wh}$ is a growth rate of the wormhole, m/s;

$v_{i,tip}$ is the acid flow velocity at a tip of the wormhole, m/s;

$PV_{bt,opt}$ is an optimal wormhole breakthrough volume, dimensionless;

$N_{AC}$ is a number of acid dissolution capacity, dimensionless;

$v_{i,opt}$ is an optimal acid flow rate at the tip of the wormhole, m/s;

Y is a reservoir width, m; and $r_{wh}$ is the length of wormhole area, m.

* * * * *